US012635006B2

(12) United States Patent
Rahman

(10) Patent No.: US 12,635,006 B2
(45) Date of Patent: May 19, 2026

(54) NETWORK CORE HANDLING OF DUAL STACK INTERNET PROTOCOL (IP)

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 458 days.

(21) Appl. No.: 18/194,464

(22) Filed: Mar. 31, 2023

(65) Prior Publication Data

US 2024/0334500 A1 Oct. 3, 2024

(51) Int. Cl.

| *H04W 76/10* | (2018.01) |
| *H04W 60/06* | (2009.01) |
| *H04W 88/06* | (2009.01) |
| *H04W 80/04* | (2009.01) |

(52) U.S. Cl.
CPC ........... H04W 76/10 (2018.02); H04W 60/06 (2013.01); *H04W 80/045* (2013.01); *H04W 88/06* (2013.01)

(58) Field of Classification Search
CPC ... H04W 76/10; H04W 60/06; H04W 80/045; H04W 88/06; H04W 76/18; H04L 61/00; H04L 69/167; H04L 2101/686
USPC .......................................................... 370/328
See application file for complete search history.

(56) References Cited

U.S. PATENT DOCUMENTS

| 2017/0026334 A1* | 1/2017 | Youn ................... H04L 61/5007 |
| 2018/0206188 A1* | 7/2018 | Nam ................. H04W 52/0229 |
| 2022/0312171 A1* | 9/2022 | Niemi ..................... H04W 4/90 |

* cited by examiner

*Primary Examiner* — Ricky Q Ngo
*Assistant Examiner* — Meheret Woldegebreal Kidane
(74) *Attorney, Agent, or Firm* — Foley IP Law, PLLC

(57) ABSTRACT

Solutions for improved network core handling of dual stack internet protocol (IP), such as IPv4v6, include receiving, by a first wireless network node, from a user equipment (UE), a request for a packet data session, the request identifying a dual stack IP type having a first IP type and a second IP type; based on at least the first IP type of the dual stack IP type not matching a supported IP type of a second wireless network node, receiving, by the first wireless network node, from the second wireless network node, a deregistration request for the UE; and transmitting, by the first wireless network node, to the UE, a message that triggers the UE to request a new packet data session without exiting the current radio access technology (RAT). In some examples, the first network node comprises an access mobility function (AMF) or a mobility management entity (MME).

20 Claims, 10 Drawing Sheets

Figure 4:
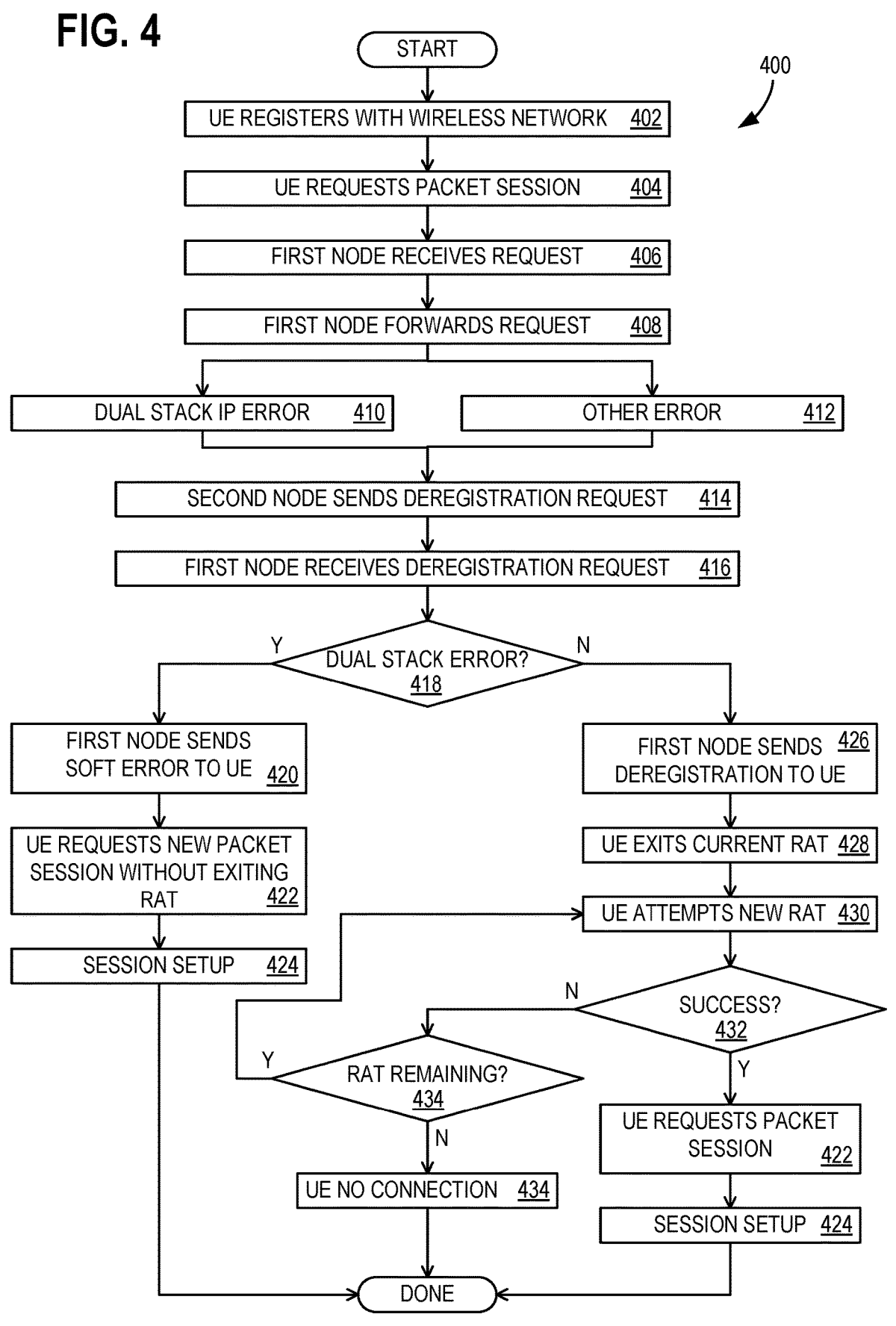

```
                              ┌──────────┐
                              │  START   │
                              └────┬─────┘
                                   │
        ┌──────────────────────────▼──────────────────────────┐
        │  UE REGISTERS WITH WIRELESS NETWORK        402       │
        └──────────────────────────┬──────────────────────────┘
                                   │
        ┌──────────────────────────▼──────────────────────────┐
        │  UE REQUESTS PACKET SESSION                404       │
        └──────────────────────────┬──────────────────────────┘
                                   │
        ┌──────────────────────────▼──────────────────────────┐
        │  FIRST NODE RECEIVES REQUEST               406       │
        └──────────────────────────┬──────────────────────────┘
                                   │
        ┌──────────────────────────▼──────────────────────────┐
        │  FIRST NODE FORWARDS REQUEST               408       │
        └───────────┬──────────────────────────┬──────────────┘
                    │                          │
    ┌───────────────▼────────┐      ┌──────────▼───────────────┐
    │ DUAL STACK IP ERROR 410│      │  OTHER ERROR        412   │
    └────────────────────────┘      └──────────┬───────────────┘
                                               │
        ┌──────────────────────────────────────▼──────────────┐
        │  SECOND NODE SENDS DEREGISTRATION REQUEST     414    │
        └──────────────────────────┬──────────────────────────┘
                                   │
        ┌──────────────────────────▼──────────────────────────┐
        │  FIRST NODE RECEIVES DEREGISTRATION REQUEST   416    │
        └──────────────────────────┬──────────────────────────┘
                                   │
         Y                ┌────────▼─────────┐        N
    ┌─────────────────────│  DUAL STACK      │──────────────────┐
    │                     │  ERROR?   418    │                  │
    │                     └──────────────────┘                  │
```

DUAL STACK IP ERROR 410

OTHER ERROR 412

SECOND NODE SENDS DEREGISTRATION REQUEST 414

FIRST NODE RECEIVES DEREGISTRATION REQUEST 416

DUAL STACK ERROR? 418

FIRST NODE SENDS SOFT ERROR TO UE 420

UE REQUESTS NEW PACKET SESSION WITHOUT EXITING RAT 422

SESSION SETUP 424

FIRST NODE SENDS DEREGISTRATION TO UE 426

UE EXITS CURRENT RAT 428

UE ATTEMPTS NEW RAT 430

SUCCESS? 432

RAT REMAINING? 434

UE NO CONNECTION 434

UE REQUESTS PACKET SESSION 422

SESSION SETUP 424

DONE

Figure 5:
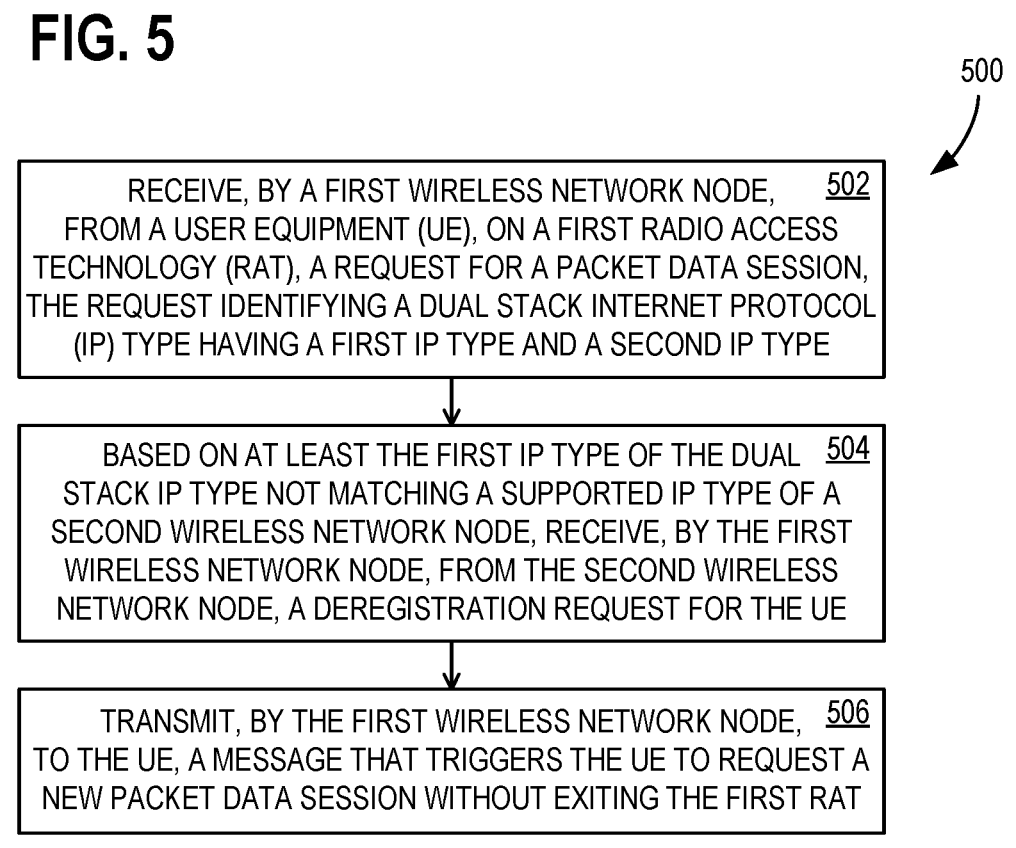

RECEIVE, BY A FIRST WIRELESS NETWORK NODE,   502
FROM A USER EQUIPMENT (UE), ON A FIRST RADIO ACCESS
TECHNOLOGY (RAT), A REQUEST FOR A PACKET DATA SESSION,
THE REQUEST IDENTIFYING A DUAL STACK INTERNET PROTOCOL
(IP) TYPE HAVING A FIRST IP TYPE AND A SECOND IP TYPE

BASED ON AT LEAST THE FIRST IP TYPE OF THE DUAL   504
STACK IP TYPE NOT MATCHING A SUPPORTED IP TYPE OF A
SECOND WIRELESS NETWORK NODE, RECEIVE, BY THE FIRST
WIRELESS NETWORK NODE, FROM THE SECOND WIRELESS
NETWORK NODE, A DEREGISTRATION REQUEST FOR THE UE

TRANSMIT, BY THE FIRST WIRELESS NETWORK NODE,   506
TO THE UE, A MESSAGE THAT TRIGGERS THE UE TO REQUEST A
NEW PACKET DATA SESSION WITHOUT EXITING THE FIRST RAT

NETWORK CORE HANDLING OF DUAL STACK INTERNET PROTOCOL (IP)

BACKGROUND

Some user equipment (UE) are dual stack internet protocol (IP) devices, so that they can support at least two IP types. Currently, dual stack devices support both IPv4 (with 32-bit addresses) and IPV6 (with 128-bit addresses) using an IPv4v6 type. Unfortunately, this apparent advantage of being able to support both IPv4 and IPv6 introduces challenges, in some circumstances. Even the Internet Engineering Task Force (IETF) recognized that a dual-stack client may actually provide a worse user experience, in some scenarios.

A problem arises when a remote resource, which the UE is attempting to reach, supports only one of the two IP types, such as either IPv4 or IPv6, but not IPv4v6. The remote resource may reject the connection. Currently, in cellular networks, which generally operate in compliance with Third Generation Partnership Project (3GPP) and other standard setting organization (SSO) technical standards (TSs), an error condition for a failure to support a UE's requested IP type results in the cellular network sending the UE a message that triggers the UE to exit the UE's preferred radio access technology (RAT), such as fifth generation cellular technology (5G), and attempt a connection on a lower RAT, such as fourth generation cellular technology (4G). Not only does this introduce delay, but the UE is forced to use a less-referred RAT when the problem is not within the RAT, but instead inside the cellular network core.

SUMMARY

The following summary is provided to illustrate examples disclosed herein, but is not meant to limit all examples to any particular configuration or sequence of operations.

Solutions for improved network core handling of dual stack internet protocol (IP), such as IPv4v6, include receiving, by a first wireless network node, from a user equipment (UE), on a first radio access technology (RAT), a request for a packet data session, the request identifying a dual stack IP type having a first IP type and a second IP type; based on at least the first IP type of the dual stack IP type not matching a supported IP type of a second wireless network node, receiving, by the first wireless network node, from the second wireless network node, a deregistration request for the UE; and transmitting, by the first wireless network node, to the UE, a message that triggers the UE to request a new packet data session without exiting the first RAT. In some examples, the first network node comprises an access mobility function (AMF) or a mobility management entity (MME).

BRIEF DESCRIPTION OF THE DRAWINGS

The disclosed examples are described below with reference to the accompanying drawing figures listed below, wherein:

FIG. 1A illustrates a fifth generation cellular technology (5G) standalone architecture (SA) version of the architecture of FIG. 1;

FIG. 4 illustrates a flowchart of exemplary operations associated with the architecture of FIG. 1;

FIG. 5 illustrates another flowchart of exemplary operations associated with the architecture of FIG. 1.

Figure 1:
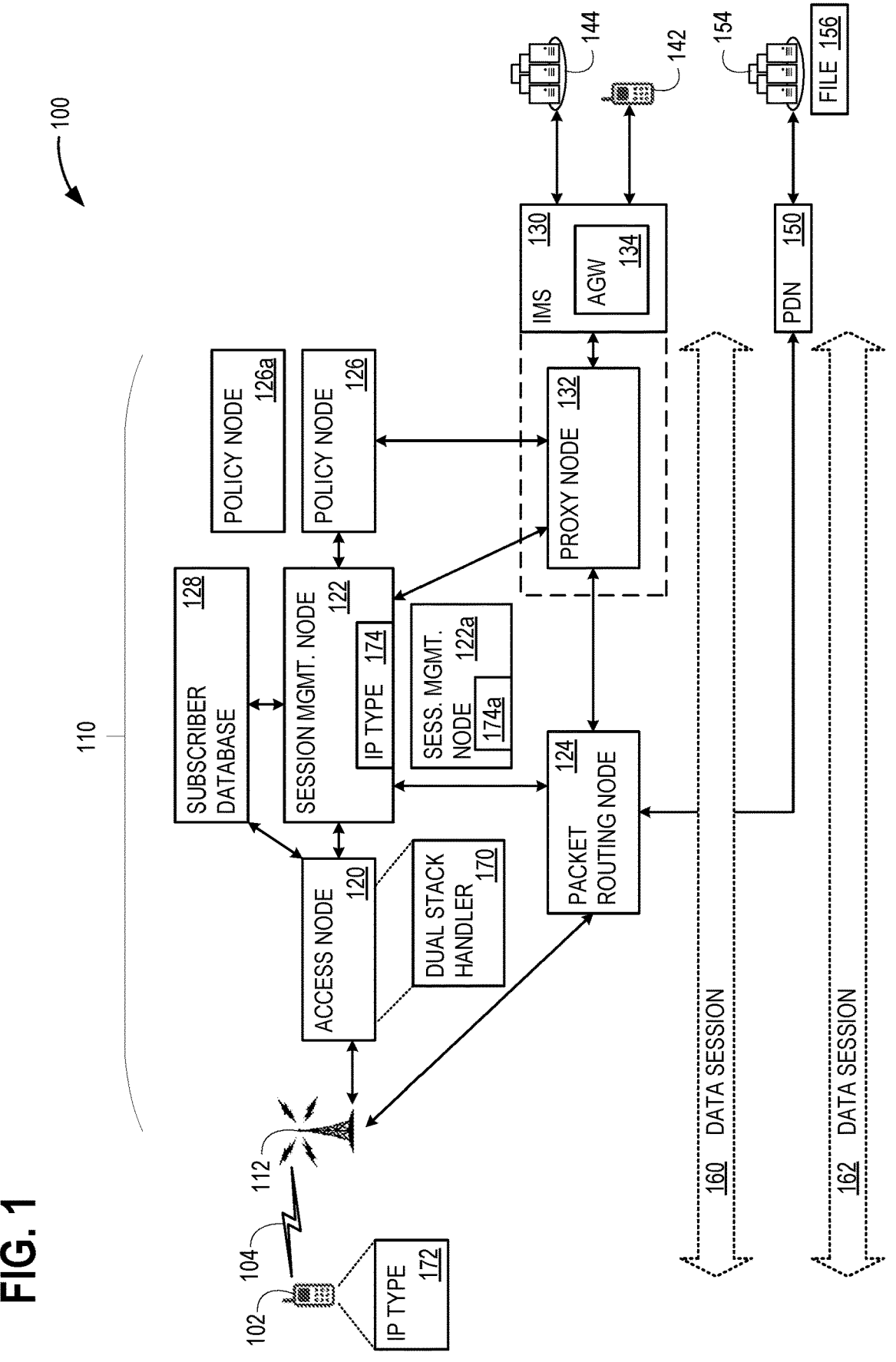
FIG. 1 illustrates an exemplary architecture that advantageously provides improved network core handling of dual stack internet protocol (IP)

Corresponding reference characters indicate corresponding parts throughout the drawings. References made throughout this disclosure, relating to specific examples, are provided for illustrative purposes, and are not meant to limit all implementations or to be interpreted as excluding the existence of additional implementations that also incorporate the recited features.

DETAILED DESCRIPTION

Solutions for improved network core handling of dual stack internet protocol (IP), such as IPv4v6, include receiving, by a first wireless network node, from a user equipment (UE), on a first radio access technology (RAT), a request for a packet data session, the request identifying a dual stack IP type having a first IP type and a second IP type; based on at least the first IP type of the dual stack IP type not matching a supported IP type of a second wireless network node, receiving, by the first wireless network node, from the second wireless network node, a deregistration request for the UE; and transmitting, by the first wireless network node, to the UE, a message that triggers the UE to request a new packet data session without exiting the first RAT.

In some fifth-generation cellular technology (5G) examples, the first network node comprises an access mobility function (AMF), the request for the packet data session comprises a protocol data unit (PDU) Session Establishment Request, the second wireless network node comprises a session management function (SMF) or a policy charging function (PCF), and the deregistration request comprises a Deregistration message. In some fourth generation cellular technology (4G) examples, the first network node comprises a mobility management entity (MME), the request for the packet data session comprises a Create Session Request, the second wireless network node comprises a packet data network gateway (PGW), or a policy and charging rules function (PCRF), and the deregistration request comprises a Detach message with re-attach not required.

When the first wireless network node receives the deregistration request for the UE from the second wireless network node, for a reason that previously resulted in triggering the UE to exit the current RAT and attempt a connection on another (typically older) RAT, the first wireless network node still passes along a message to the UE that triggers the UE to exit the current RAT. That is, when the first wireless network node identifies that the reason for the incoming deregistration request is the dual stack IP type, the first wireless network node selects a message that advantageously retains the UE on its preferred RAT.

Aspects of the disclosure improve the reliability and performance of cellular communications by advantageously enabling a UE to remain on its preferred RAT, despite an error triggered by a dual stack IP type. This is accomplished, at least in part, by transmitting, by the first wireless network node, to the UE, a message that triggers the UE to request a new packet data session without exiting the first RAT.

With reference now to the figures, FIG. 1 illustrates an architecture 100 that advantageously provides improved network core handling of dual stack IP. A UE 102 is a dual stack IP device, supporting a dual stack IP type 172. In this illustrated example, IP type 172 is IPv4v6. UE 102 communicates with a wireless network 110 using an air interface 104 with a radio access network (RAN) 112. RAN 112 is in communication with an access node 120 and a packet routing node 124. Access node 120 is in communication with a session management node 122 and a subscriber database 128. Wireless network 110 has multiple session management nodes, including session management node 122 and another session management node 122a.

Session management node 122 is in communication with subscriber database 128, packet routing node 124, a policy node 126, and a proxy node 132. Wireless network 110 has multiple policy nodes, including policy node 126, and another policy node 126a. Proxy node 132 is in communication with packet routing node 124, policy node 126, and an IP multimedia system (IMS) access gateway (IMS-AGW) 134 within an IMS 130. In some examples, proxy node 132 is also considered to be within IMS 130.

IMS 130 enables UE 102 to access multimedia resources, such as a having a voice or video call with another UE 142 or accessing data in remote resource 144, using a packet data session 160. Packet routing node 124 enables UE 102 to access other data, such as a data file 156 on a remote resource 154 across a packet data network 150, such as the internet. This is accomplished using a packet data session 162.

As illustrated, session management node 122 supports a supported IP type 174, and session management node 122a supports a supported IP type 174a. In this example, Policy node 126 also supports IP type 174 and policy node 126a supports IP type 174a. This way, for a UE using IP type 174, session management node 122 and policy node 126 are able to support that UE, whereas for another UE using IP type 174a, session management node 122a and policy node 126a are able to support that other UE. In this example, either of IP type 174 or IP type 174a may be IPv4, with the other being IPV6.

Access node 120 is illustrated as having a dual stack IP handler 170 that handles error conditions related to unsupported IP types for dual stack UEs, such as UE 102. As will be described below, dual stack IP handler 170 intercepts deregistration requests intended for UE 102 that, in normal operation, would trigger UE 102 to exit its current RAT (e.g., exit wireless network 110), and attempt to reconnect with a different RAT. Typically, this would be a lower (older) RAT, such as a UE moving from 5G to 4G, then to an older cellular technology, if a connection attempt with 4G did not work.

Figure 1A:
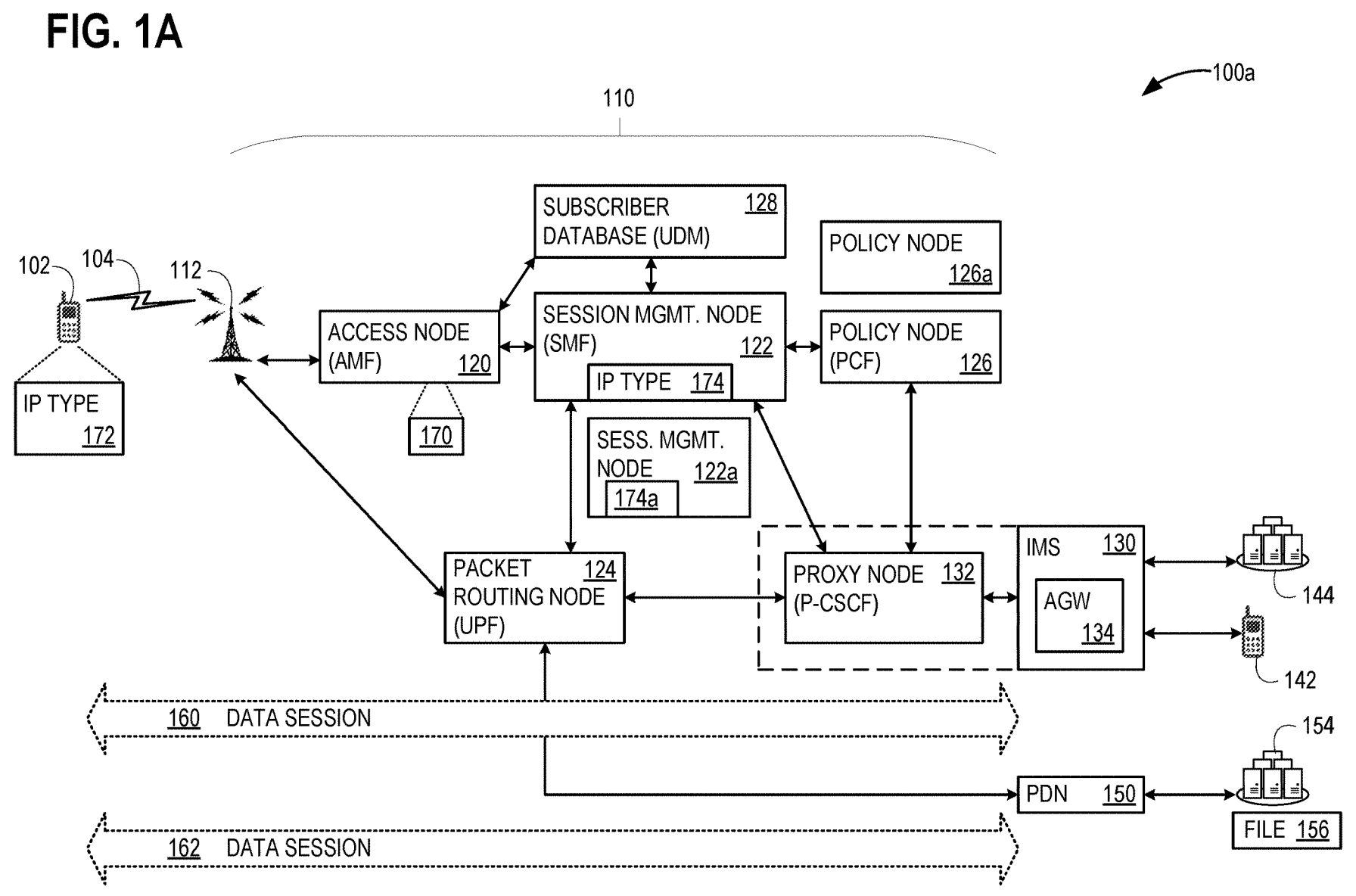
Figure 1B:
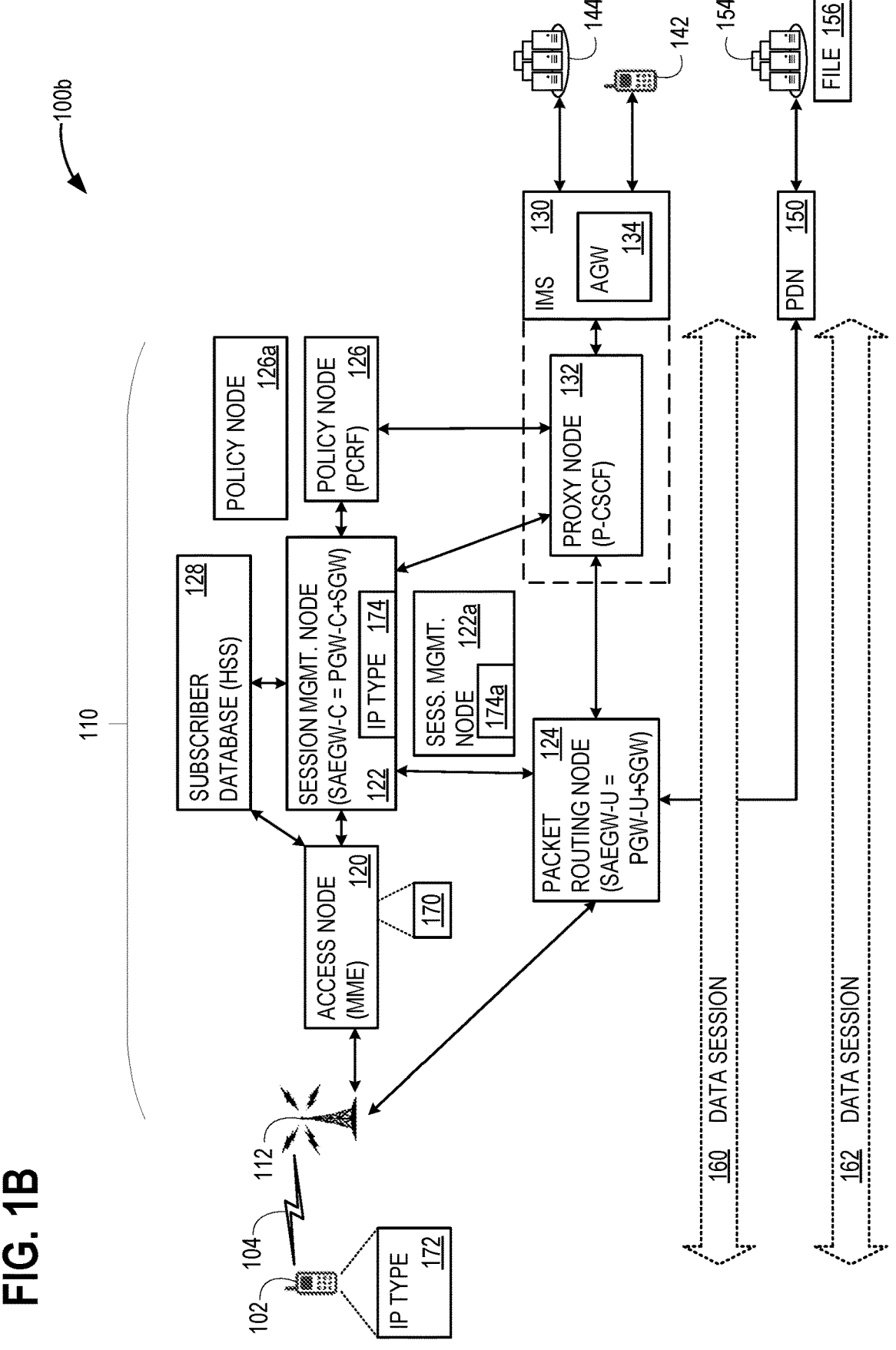
FIG. 1B illustrates a fourth generation cellular technology (4G) version of the architecture of FIG. 1.
Figure 1C:
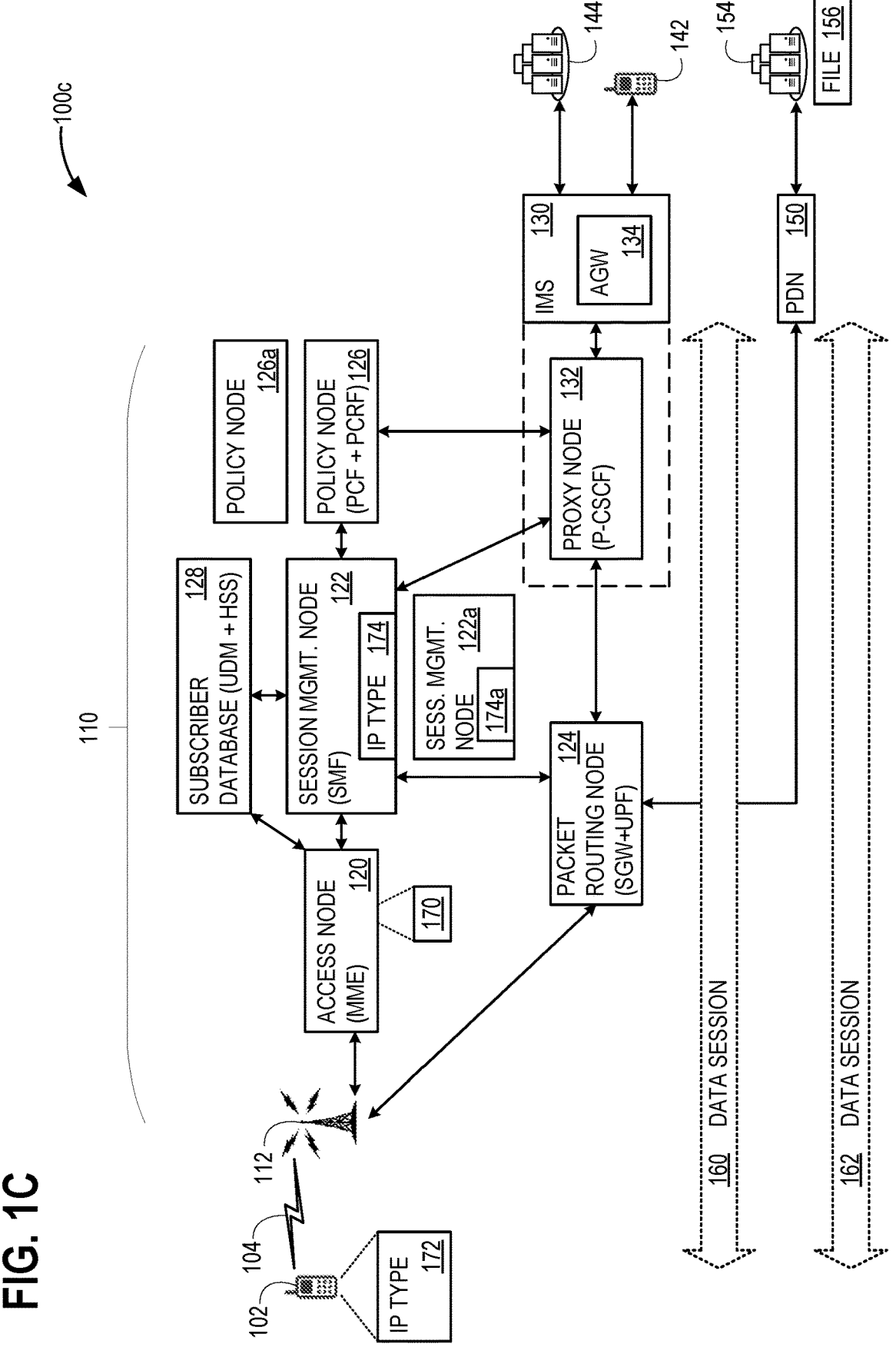
FIG. 1C illustrates a mixed 5G and 4G version of the architecture of FIG. 1.

FIG. 1A illustrates a 5G standalone architecture (SA) version of architecture 100, FIG. 1B illustrates a 4G version of architecture 100, and FIG. 1C illustrates a mixed 5G and 4G version of architecture 100. Except when noting aspects of architecture 100 that are specific to 5G or 4G, further mentions of architecture 100 also apply architecture 100a of FIG. 1A, architecture 100b of FIG. 1B, and/or architecture 100c of FIG. 1C.

In FIG. 1A, RAN 112 comprises a gNodeB (gNB), access node 120 comprises an access mobility function (AMF), session management node 122 comprises a session management function (SMF), packet routing node 124 comprises a user plane function (UPF), policy node 126 comprises a policy charging function (PCF), and subscriber database 128 comprises a unified data management (UDM) node. In some examples, proxy node 132 comprises a proxy call session control function (P-CSCF).

In FIG. 1B, RAN 112 comprises an eNodeB (eNB), access node 120 comprises a mobility management entity (MME), session management node 122 comprises a system architecture evolution gateway (SAEGW) control plane (SAEGW-C), packet routing node 124 comprises a SAEGW-user plane (SAEGW-U), policy node 126 comprises a policy and charging rules function (PCRF), and subscriber database 128 comprises a home subscriber service (HSS) node. In some examples, proxy node 132 comprises a proxy call session control function (P-CSCF). An SAEGW is a combination of a serving gateway (SGW) and a packet data network gateway (PGW).

In FIG. 1C, RAN 112 comprises an (eNB), access node 120 comprises an MME, session management node 122 comprises an SMF, packet routing node 124 comprises an SGW and/or a UPF, policy node 126 comprises a PCF and/or a PCRF, and subscriber database 128 comprises a UDM and/or an HSS. In some examples, proxy node 132 comprises a proxy call session control function (P-CSCF).

Figure 2:
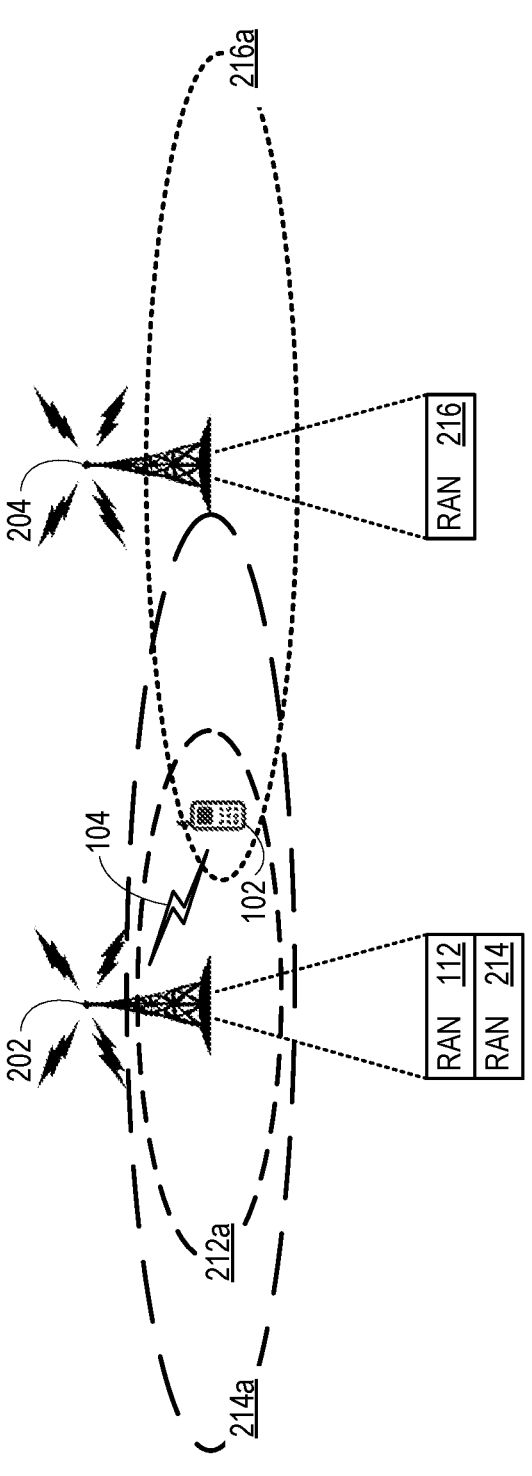
FIG. 2 illustrates a UE under coverage of two different RATs, as may occur with the architecture of FIG. 1.

FIG. 2 illustrates UE 102 under coverage of two different RATs, as may occur with some examples of architecture 100. A cell site 202 hosts two co-located base stations, shown as RAN 112 and another RAN 214. The dashed lines indicating coverage represent a RAT 212a for RAN 112, and a RAT 214a for RAN 214.

In the illustrated example, another nearby cell site 204 hosts a RAN 216, supporting a RAT 216a. In an example, RAT 212a is a 5G RAT, RAT 214a is a 4G RAT, and RAT 216a is a third generation cellular technology (3G) RAT. If UE 102 receives a 5G deregistration message, UE 102 will deregister from RAN 112 and attempt a connection using RAT 214a. If that is unsuccessful such as if UE 102 receives a 4G Detach of the type re-attach not required, UE 102 will deregister from RAN 112 and attempt a connection using RAT 216a. In this way, UE 102 degrades its RAT until it has found one that will support the requested packet data session, or it runs out of compatible, available RATs.

Figure 3A:
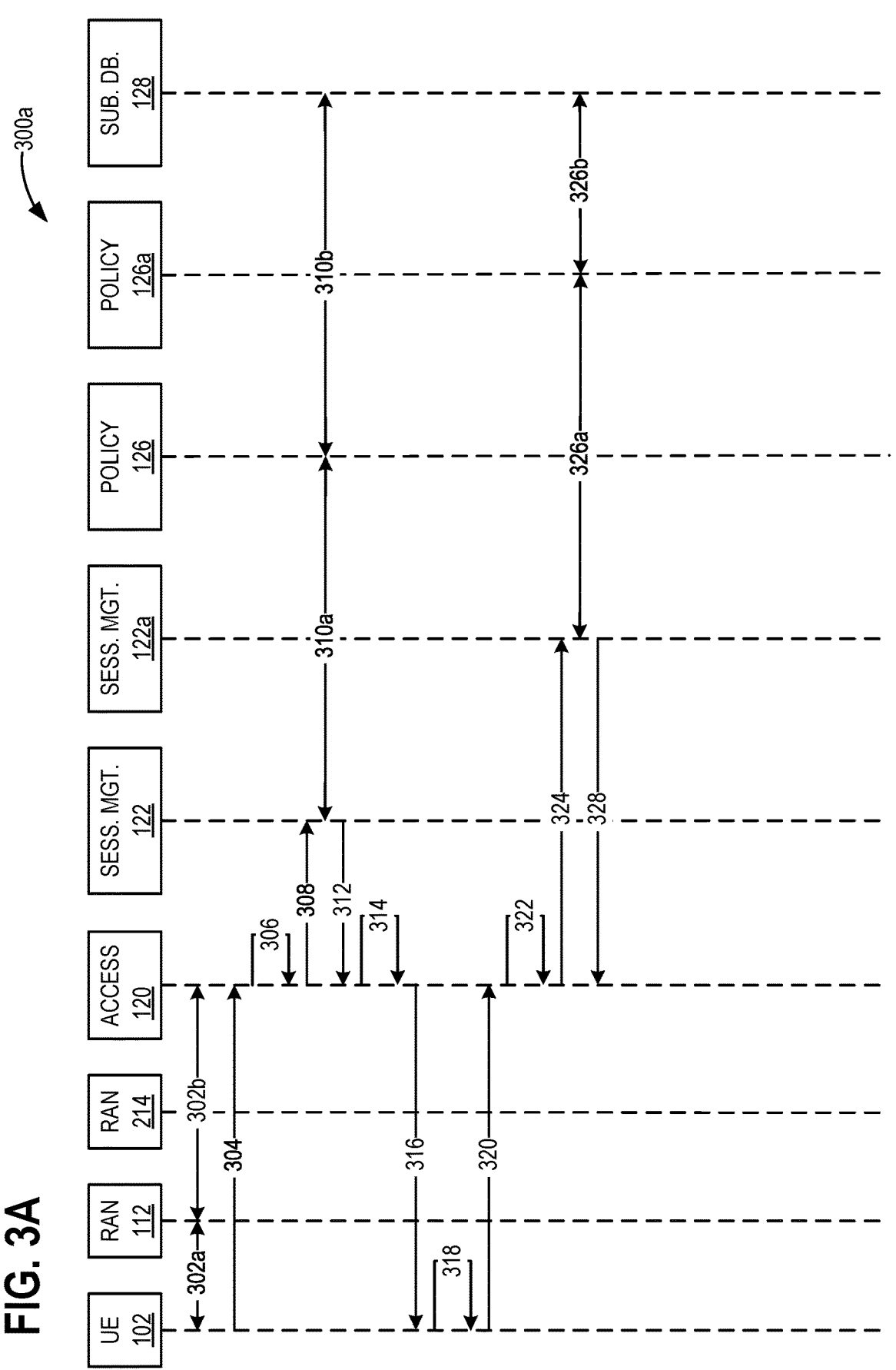
FIG. 3A illustrates a message sequence diagram for messages that may occur when the architecture of FIG. 1 advantageously enables a user equipment (UE) to remain on its preferred radio access technology (RAT), despite an despite an error triggered by a dual stack IP type.
Figure 3B:
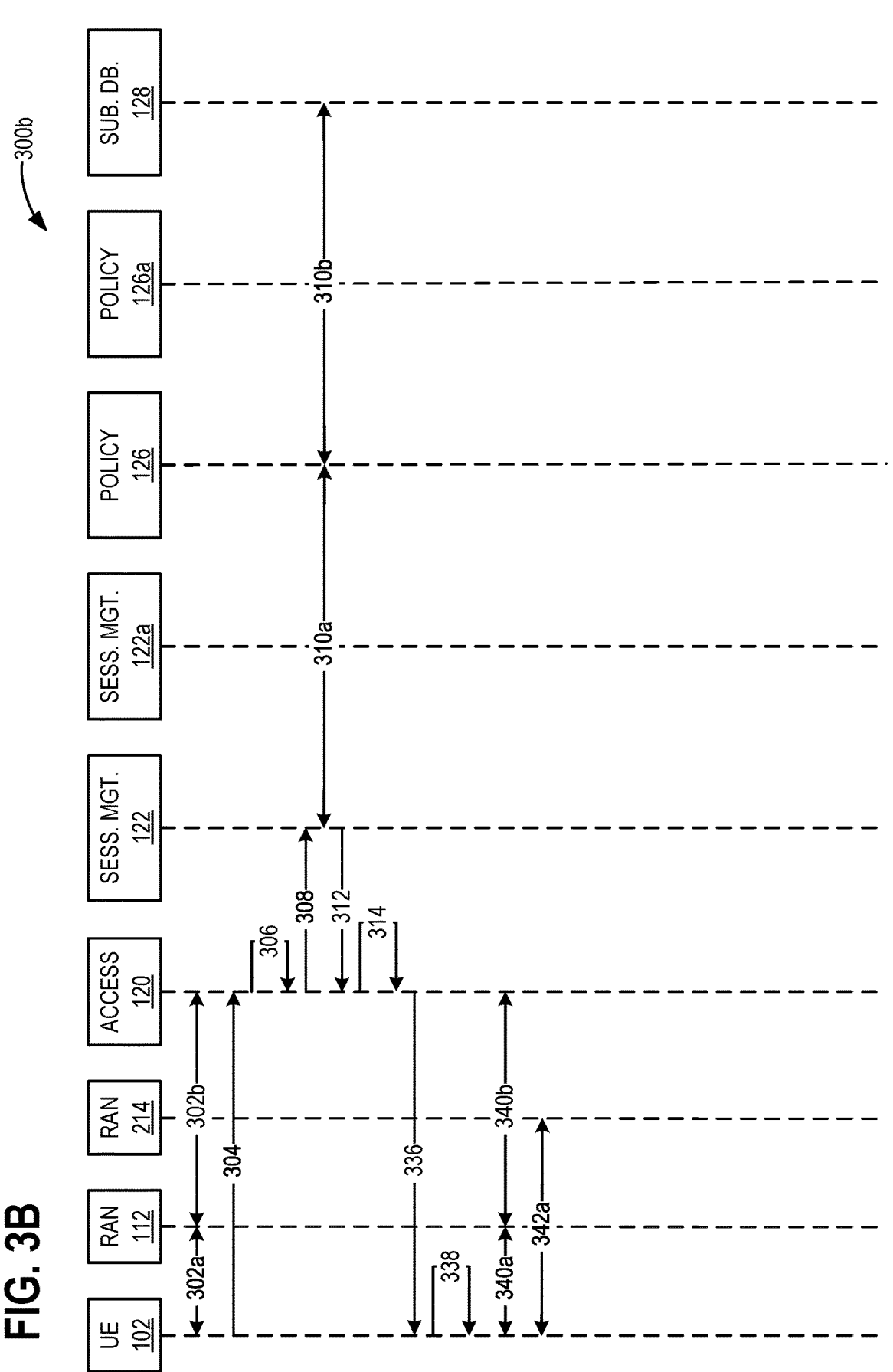
FIG. 3B illustrates a message sequence diagram for messages that may occur when the architecture of FIG. 1 permits a UE to move to a new RAT because of an error condition other than an error triggered by a dual stack IP type.

FIG. 3A illustrates a message sequence diagram 300a for messages that may occur when architecture 100 advantageously enables UE 102 to remain on its preferred RAT (e.g., RAT 212a), even when an incompatibility of some nodes of wireless network 110 with a dual stack IP type would result in one of the nodes sending a deregistration request to UE 102 through access node 120. FIG. 3B illustrates a message sequence diagram 300b for messages that may occur when architecture 100 permits UE 102 to move to a new RAT because of an error condition other than an incompatibility with dual stack IP.

FIGS. 3A and 3B will be described in conjunction with FIG. 4. FIG. 4 illustrates a flowchart 400 of exemplary operations associated with architecture 100. In some examples, at least a portion of flowchart 400 may be performed using one or more computing devices 600 of FIG. 6.

Flowchart 400 commences with UE 102 registering with wireless network 110 in operation 402, specifically RAN 112 and access node 120. This is shown as messages 302a and 302b in FIGS. 3A and 3B. In some examples, RAN 112 comprises a gNB or eNB, and access node 120 comprises an AMF or MME. In operation 404, UE 102 requests PDU session 160 with dual stack IP identified, using a request 304. In some examples, request 304 comprises a PDU Session Establishment Request or a Create Session Request, and the dual stack IP type comprises IPv4v6. Access node 120 receives request 304 from UE 102 on RAT 212a in operation 406.

In operation 408, access node 120 selects a session management node to handle the request for the packet data session, which is shown as message 306, and forwards the request to session management node 122 as a request 308. Also, in operation 408, session management node 122 sends a message 310a to policy node 126 (e.g., a PCF or a PCRF), and attempts to start a subscription with subscriber database 128 (e.g., a UDM or HSS).

However, in this example, there is an error condition. In branch 410 of flowchart 400, the error is a result of an unsupported IP type. That is, supported IP type 174 does not match the requested IP type in request 304 (which is forwarded as request 308). Alternatively, in branch 412 of flowchart 400, the error is a result of some other condition, different than merely an unsupported IP type. For example, the error condition may be that Network Slice Selection Assistance Information (NSSAI) cannot be provided for UE 102.

In either situation, another wireless network node (e.g., session management node 122 or policy node 126) transmits a deregistration request 312 for UE 102 to access node 120 in operation 414. Access node 120 receives deregistration request 312 in operation 416. In some examples, this other wireless network node that transmits deregistration request 312 to access node 120 comprises an SMF, a PCF, a PGW, or a PCRF. In some examples, deregistration request 312 comprises a 5G Deregistration message or a 4G Detach message with re-attach not required.

In decision operation 418, also shown as message 314, access node 120 uses dual stack IP handler 170 to determine whether deregistration request 312 is a result of UE 102 being a dual stack IP device, or a different error condition.

If it is a dual stack IP issue, then when access node 120 received deregistration request 312 in operation 414, it was based on at least one IP type of the dual stack IP type not matching supported IP type 174 of the other wireless network node. So, in operation 420, access node 120 transmits a message 316 to UE 102 that triggers UE 102 to request a new packet data session without exiting RAT 212a. UE 102 processes message 316 (shown as a message 318) and requests a new packet data session using a message 320 to access node 120, without exiting RAT 212a, in operation 422.

Operation 424 sets up the new PDU session for UE 102 in operation 424. Access node selects (shown as a message 322) a new session management node (e.g., session management node 122a), which can support the requested IP type, and transmits a message 324 to session management node 122a. Session management node 122a uses messages 326a to policy node 126a and message 326b to subscriber database 128, and responds to access node 120 with a message 328.

However, if it is not a dual stack IP issue, then when access node 120 received deregistration request 312 in operation 414, it was based on at least an error condition different than one IP type of the dual stack IP type not matching supported IP type 174 of the other wireless network node. In operation 426, based on at least receiving deregistration request 312 for an error condition different than one IP type of the dual stack IP type not matching supported IP type 174, access node 120 transmits a message 336 to UE 102 that triggers UE 102 to exit RAT 212a and attempt a connection on a second RAT (e.g. RAT 214a or 316a).

UE 102 processes message 336 (shown as a message 338) and exits RAT 212a in operation 428. To accomplish this, UE 102 sends a deregistration message 340a to RAN 112, which forwards it as message 340b to access node 120. In operation 430, UE 102 attempts a new connection with RAT 214a (or RAT 216a) using messages 342a with RAN 214 (or RAN 216).

If the connection was not successful, as determined in decision operation 432, UE 102 determines whether another RAT is available. If not, as determined in decision operation 434, UE 102 is left with no connection in operation 434. If there is another RAT remaining, flowchart 400 returns to operation 430 to attempt a connection. Upon achieving a successful RAT connection, UE 102 requests a new packet data session in operation 422, which is set up in operation 424.

FIG. 5 illustrates a flowchart 500 of exemplary operations associated with examples of architecture 100. In some examples, at least a portion of flowchart 500 may be performed using one or more computing devices 600 of FIG. 6. Flowchart 500 commences with operation 502, which includes receiving, by a first wireless network node, from a UE, on a first RAT, a request for a packet data session, the request identifying a dual stack IP type having a first IP type and a second IP type.

Operation 504 includes, based on at least the first IP type of the dual stack IP type not matching a supported IP type of a second wireless network node, receiving, by the first wireless network node, from the second wireless network node, a deregistration request for the UE. Operation 506 includes transmitting, by the first wireless network node, to the UE, a message that triggers the UE to request a new packet data session without exiting the first RAT.

Figure 6:
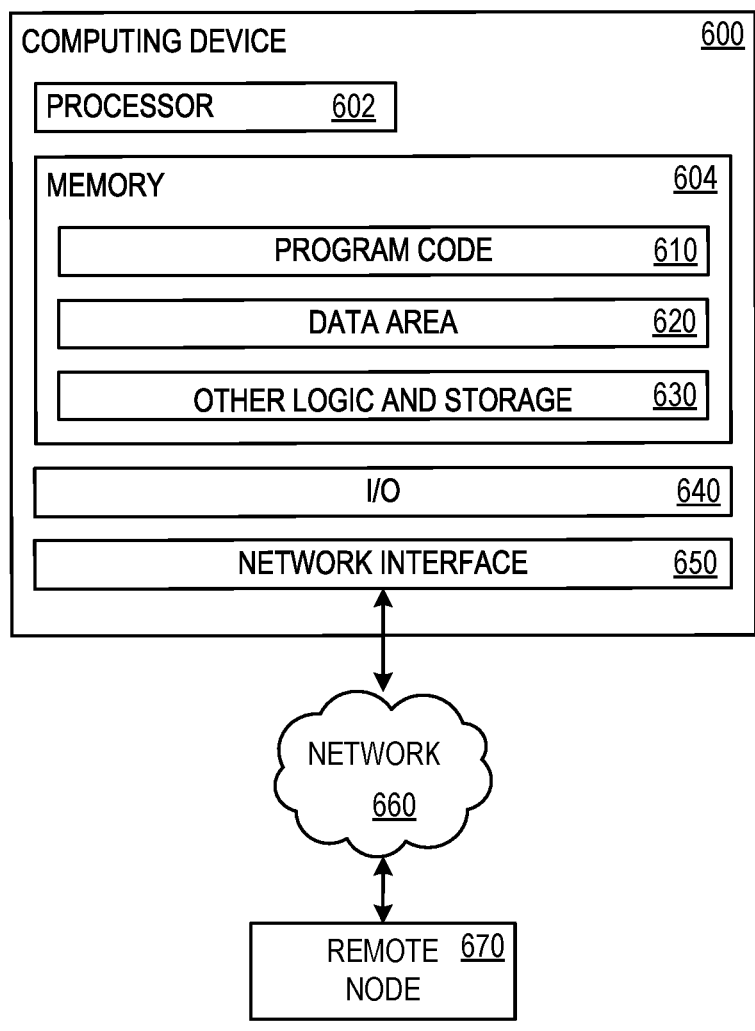
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/ or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including instructions used to perform operations described herein. Data area 620 holds data used to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within architecture 100.

Additional Examples

An example system comprises: a processor; and a computer-readable medium storing instructions that are operative upon execution by the processor to: receive, by a first wireless network node, from a UE, on a first RAT, a request for a packet data session, the request identifying a dual stack IP type having a first IP type and a second IP type; based on at least the first IP type of the dual stack IP type not matching a supported IP type of a second wireless network node, receive, by the first wireless network node, from the second wireless network node, a deregistration request for the UE; and transmit, by the first wireless network node, to the UE, a message that triggers the UE to request a new packet data session without exiting the first RAT.

An example method comprises: receiving, by a first wireless network node, from a UE, on a first RAT, a request for a packet data session, the request identifying a dual stack IP type having a first IP type and a second IP type; based on at least the first IP type of the dual stack IP type not matching a supported IP type of a second wireless network node, receiving, by the first wireless network node, from the second wireless network node, a deregistration request for the UE; and transmitting, by the first wireless network node, to the UE, a message that triggers the UE to request a new packet data session without exiting the first RAT.

One or more example computer storage devices has computer-executable instructions stored thereon, which, upon execution by a computer, cause the computer to perform operations comprising: receiving, by a first wireless network node, from a UE, on a first RAT, a request for a packet data session, the request identifying a dual stack IP type having a first IP type and a second IP type; based on at least the first IP type of the dual stack IP type not matching a supported IP type of a second wireless network node, receiving, by the first wireless network node, from the second wireless network node, a deregistration request for the UE; and transmitting, by the first wireless network node, to the UE, a message that triggers the UE to request a new packet data session without exiting the first RAT.

Alternatively, or in addition to the other examples described herein, examples include any combination of the following:

the dual stack IP type comprises IPv4v6;

the request for the packet data session comprises a PDU Session Establishment Request or a Create Session Request;

the first wireless network node comprises an AMF or an MME;

the second wireless network node comprises an SMF, a PCF, a PGW, or a PCRF;

the deregistration request comprises a 5G Deregistration message or a 4G Detach message with re-attach not required;

based on at least receiving, by the first wireless network node, from the second wireless network node, the deregistration request for the UE for an error condition different than the first IP type of the dual stack IP type not matching the supported IP type of the second wireless network node, transmitting, by the first wireless network node, to the UE, a message that triggers the UE to exit the first RAT and attempt a connection on a second RAT;

transmitting the message that triggers the UE to request a new packet data session without exiting the first RAT is in response to (based on at least) receiving the deregistration request for the UE;

the request for the packet data session comprises a PDU Session Establishment Request, the first wireless network node comprises an AMF, and the second wireless network node comprises an SMF or a PCF;

the request for the packet data session comprises a Create Session Request, the wireless network node comprises an MME, and the second wireless network node comprises a PGW or a PCRF;

the first IP type is IPv4 and the second IP type is IPv6;

the first IP type is IPv6 and the second IP type is IPv4; and the error condition different than the first IP type of the dual stack IP type not matching the supported IP type of the second wireless network node comprises NSSAI cannot be provided for the UE.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

receiving, by a first wireless network node, a request for a packet data session from a user equipment (UE) registered on a first radio access technology (RAT), the request for the packet data session identifying a dual stack internet protocol (IP) type having a first IP type and a second IP type;

forwarding the request for the packet data session to a second wireless network node, wherein the first IP type is not supported by the second wireless network node;

receiving, by the first wireless network node, a deregistration request for the UE in response to the request for the packet data session, the deregistration request indicating that the UE should deregister from the first RAT based on the first IP type not being supported by the second wireless network node; and transmitting, by the first wireless network node, a soft error message to the UE without transmitting the deregistration request to the UE, the soft error message instructing the UE to request a new packet data session without exiting the first RAT.

2. The method of claim 1, wherein the first IP type is IPv4v6.

3. The method of claim 1, wherein the request for the packet data session comprises a protocol data unit (PDU) Session Establishment Request or a Create Session Request.

4. The method of claim 1, wherein the first wireless network node comprises an access mobility function (AMF) or a mobility management entity (MME).

5. The method of claim 1, wherein the second wireless network node comprises a session management function (SMF), a policy charging function (PCF), a packet data network gateway (PGW), or a policy and charging rules function (PCRF).

6. The method of claim 1, wherein the deregistration request comprises a fifth generation cellular technology (5G) Deregistration message.

7. A system comprising:

a processor; and a computer-readable medium storing programming instructions for execution by the processor, the programming instructions, upon execution by the processor, causing the system to perform the following operations:

receiving, by a first wireless network node, a request for a packet data session from a user equipment (UE) registered on a first radio access technology (RAT), the request for the packet data session identifying a dual stack internet protocol (IP) type having a first IP type and a second IP type;

forwarding the request for the packet data session to a second wireless network node, wherein the first IP type is not supported by the second wireless network node;

receiving, by the first wireless network node, a deregistration request for the UE in response to the request for the packet data session the deregistration request indicating that the UE should deregister from the first RAT based on the first IP type not being supported by the second wireless network node; and transmitting, by the first wireless network node, a soft error message to the UE without transmitting the deregistration request to the UE, the soft error message instructing the UE to request a new packet data session without exiting the first RAT.

8. The system of claim 7, wherein the first IP type is IPv4v6.

9. The system of claim 7, wherein the request for the packet data session comprises a protocol data unit (PDU) Session Establishment Request or a Create Session Request.

10. The system of claim 7, wherein the first wireless network node comprises an access mobility function (AMF) or a mobility management entity (MME).

11. The system of claim 7, wherein the second wireless network node comprises a session management function (SMF), a policy charging function (PCF), a packet data network gateway (PGW), or a policy and charging rules function (PCRF).

12. The system of claim 7, wherein the deregistration request comprises a fifth generation cellular technology (5G) Deregistration message.

13. One or more computer storage devices having programming instructions stored thereon, which, upon execution by a processor of a computer system, cause the computer system to perform the following operations:

receiving, by a first wireless network node, a request for a packet data session from a user equipment (UE) registered on a first radio access technology (RAT), the request for the packet data session identifying a dual stack internet protocol (IP) type having a first IP type and a second IP type;

forwarding the request for the packet data session to a second wireless network node, wherein the first IP type is not supported by the second wireless network node;

receiving, by the first wireless network node, a deregistration request for the UE in response to the request for the packet data session, the deregistration request indicating that the UE should deregister from the first RAT based on the first IP type not being supported by the second wireless network node; and transmitting, by the first wireless network node, a soft error message to the UE without transmitting the deregistration request to the UE, the soft error message instructing the UE to request a new packet data session without exiting the first RAT.

14. The one or more computer storage devices of claim 13, wherein the first IP type is IPv4v6.

15. The one or more computer storage devices of claim 13, wherein the request for the packet data session comprises a protocol data unit (PDU) Session Establishment Request or a Create Session Request.

16. The one or more computer storage devices of claim 13, wherein the first wireless network node comprises an access mobility function (AMF) or a mobility management entity (MME).

17. The one or more computer storage devices of claim 13, wherein the second wireless network node comprises a session management function (SMF), a policy charging function (PCF), a packet data network gateway (PGW), or a policy and charging rules function (PCRF).

18. The one or more computer storage devices of claim 13, wherein the deregistration request comprises a fifth generation cellular technology (5G) Deregistration message.

19. The one or more computer storage devices of claim 13, wherein the deregistration request comprises a fourth generation cellular technology (4G) Detach message.

20. The method of claim 1, wherein the deregistration request comprises a fourth generation cellular technology (4G) Detach message.

\* \* \* \* \*